US006993531B1

(12) United States Patent
Naas

(10) Patent No.: US 6,993,531 B1
(45) Date of Patent: Jan. 31, 2006

(54) SYSTEM AND METHOD OF ROUTINE NAVIGATION

(76) Inventor: Aaron J. Naas, 8211 University Ridge Dr., Apt. 305, Charlotte, NC (US) 28213

( * ) Notice: Subject to any disclaimer, the term of this patent is extended or adjusted under 35 U.S.C. 154(b) by 998 days.

(21) Appl. No.: 09/322,627

(22) Filed: May 28, 1999

Related U.S. Application Data

(60) Provisional application No. 60/118,562, filed on Feb. 4, 1999.

(51) Int. Cl.
G06F 17/30 (2006.01)

(52) U.S. Cl. .......................... 707/102; 707/10; 715/513
(58) Field of Classification Search ................. 707/513, 707/501, 100, 10, 102; 709/245, 247, 203, 709/223, 250, 219; 382/233; 717/8; 705/26, 705/78, 39; 345/156, 435
See application file for complete search history.

(56) References Cited

U.S. PATENT DOCUMENTS

| 5,760,771 | A | | 6/1998 | Blonder | |
|---|---|---|---|---|---|
| 5,848,424 | A | | 12/1998 | Scheinkman | ............. 715/501.1 |
| 6,032,196 | A | * | 2/2000 | Monier | ........................ 709/245 |
| 6,038,598 | A | * | 3/2000 | Danneels | ..................... 709/219 |
| 6,163,779 | A | * | 12/2000 | Mantha et al. | .............. 707/100 |
| 6,182,072 | B1 | * | 1/2001 | Leak et al. | .................... 707/10 |

OTHER PUBLICATIONS

Jon M. Kleinberg, "Authoritative Sources in a Hyperlinked Environment", IBM Research Report RJ 10076(91892) May 1997, pp. 668–677.*

Cached copy of Web Pages from google.com printed Aug. 27, 2001 from backlight Events Archive entitled backlight Archives (8 pages) http://www.gcatt.gatech.edu/light/backlight.html.
Web Pages from urlwire.com printed Aug. 27, 2001 entitled New ProLaunch Service Plays Matchmaker: Matching Web Sites to Web User Interests, Friday, Aug. 21, 1998, (2 pages) http://www.urlwire.com/newsarchive/082198a.html.
Web Pages from I–probe.com printed Aug. 27, 2001 entitled Internet Guides, directories, portals and indexes (3 pages) http://www.i–probe.com/I–probe/ip_guides.html.
Web Pages from thestandard.com printed Aug. 27, 2001 entitled The Industry Standard Magazine, Conquering the Glut, *Groll Stephanie*, Jan. 24, 2000, (4 pages) http://www.thestandard.com/article/0,1902,8854,00.html.

(Continued)

*Primary Examiner*—Mohammad Ali
(74) *Attorney, Agent, or Firm*—The Eclipse Group; Kevin E. Flynn

(57) ABSTRACT

A system and method for navigating through routinely visited web pages with a browser that allows a user to navigate through the web pages using a "Next/Previous" paradigm. The system includes a routine list having at least one routine, each routine including user ordered user specified URLs, means for editing the routine list and its URLs, means for establishing and specifying a routine from the routine list, and means for sequentially moving from one URL in the specified routine to another URL in the specified routine. By specifying a routine from the routine list, the user can visit a desired group of web pages in a desired order. The moving means allows the user to easily navigate from one web page to another web page in the specified routine in accordance with the user specified order of web pages associated with such routine regardless of any spontaneous browsing conducted by the user.

5 Claims, 10 Drawing Sheets

OTHER PUBLICATIONS

Web Page from etour.com printed Oct. 8, 1999 entitled Now You can Surf the Web Without Searching.

Cached copy of Web Pages from google.com printed Aug. 27, 2001 entitled InternetNews–Advertising Report—Ask Jeeves Snaps up eTour, *Saunders, Christopher,* May 22, 2001, (3 pages) http://www.internetnews.com/IAR/article/0,,12_770961,00.html.

Web Pages from eTour.com printed Aug. 27, 2001 entitled How it Works (2 pages) http://www.etour.com/howitworks.htm.

Web Pages from quickbrowse.com printed Aug. 28, 2001 entitled On Metabrowsing (7 pages) http://www.quickbrowse.com/press/metabrowing/.

Web Pages from quickbrowse.com printed Aug. 28, 2001 entitled The Quickbrowse Story (6 pages) http://www.quickbrowse.com/story/.

Web Pages from quickbrowse.com printed Aug. 28, 2001 entitled Internet Site of the Week, *Waltham, Tony,* Bangkok Post, Mar. 3, 1999 (2 pages) http://www.quickbrowse.com/press/bangkokpost/030399_Database22.html.

Web Pages from quickbrowse.com printed Aug. 28, 2001 entitled Let the Browser do the Walking, *Cunningham, Michael,* The Irish Times, Monday, Mar. 29, 1999 (3 pages) http://www.quickbrowse.com/press/irishtimes.html.

Web Pages from quickbrowse.com printed Aug. 28, 2001 entitled Worth A Look: Quickbrowse, *Sherman Chris,* Aug. 6, 1999 (3 pages) http//www.quickbrowse.com/press/about-com.html.

Web Page from quickbrowse.com printed Aug. 28, 2001 entitled Welcome to Quickbrowse (1 page) http://www.quickbrowse.com.

Web Page from quickbrowse.com printed Aug. 28, 2001 entitled Welcome to Quickbrowse (1 page) http://www.quickbrowse.com/index_regular.cgi.

Web Pages from quickbrowse.com printed Aug. 28, 2001 entitled Current Technical Issues, (21 pages) http://www.quickbrowse.com/support/.

Web Pages from quickbrowse.com printed Aug. 28, 2001 entitled Company information (4 pages) http://www.quickbrowse.com/company.

Web Pages from google.com printed Aug. 30, 2001 entitled Info Tech Update, Aug. 1998, vol. 2, No. 7, (4 pages) Description of Web PrintSmart program appears in p. 4 of an Aug. 30, 2001 printout of www.extension.umn.edu/newsletters/infotech/itus–8–31–98.html containing the Aug. 1998 edition of *Info Tech Updates* http://www.google.com/search?q=. . . /itu8–31–8.html++Web+PrintSmart++1998&hl=en&lang$_{13}$ e.

Web Pages from google.com printed Aug. 30, 2001 entitled Software@DigitalDarkroom (7 pages) Description of Web PrintSmart program appears in pp. 6–7 of an Aug. 30, 2001 printout of Google's cached copy of Skyscraper.fortunecity.com/skully/129/software.htm by Than Kok Leong in an edition of *Digital Darkroom.* http://www.google.com/se . . . /software.htm++Web+PrintSmart++1.0++February+&hl=en&Ir=lan g_e.

Web Pages from google.com printed Aug. 30, 2001 entitled Software Downloads and Descriptions (7 pages). Description of BIGpage freeware is on p. 5. http://www.95net.com/software/downloads.htm.

Web Pages from downloadsafari.com printed Aug. 30, 2001 entitled Download BIGpage 1.51 (3 pages) with date Mar. 17, 1999, http://www.downloadsafari.com/Files/inetbrowsersaddons/B/BIGpage.html.

Web page from WebZIP Online Browser—Spidersoft—Homepage dated Oct. 8, 1999, BIGpage.jpg (1 page) contains a description of BIGpage and shows the remote control style user interface, www.spidersoft.com.

\* cited by examiner

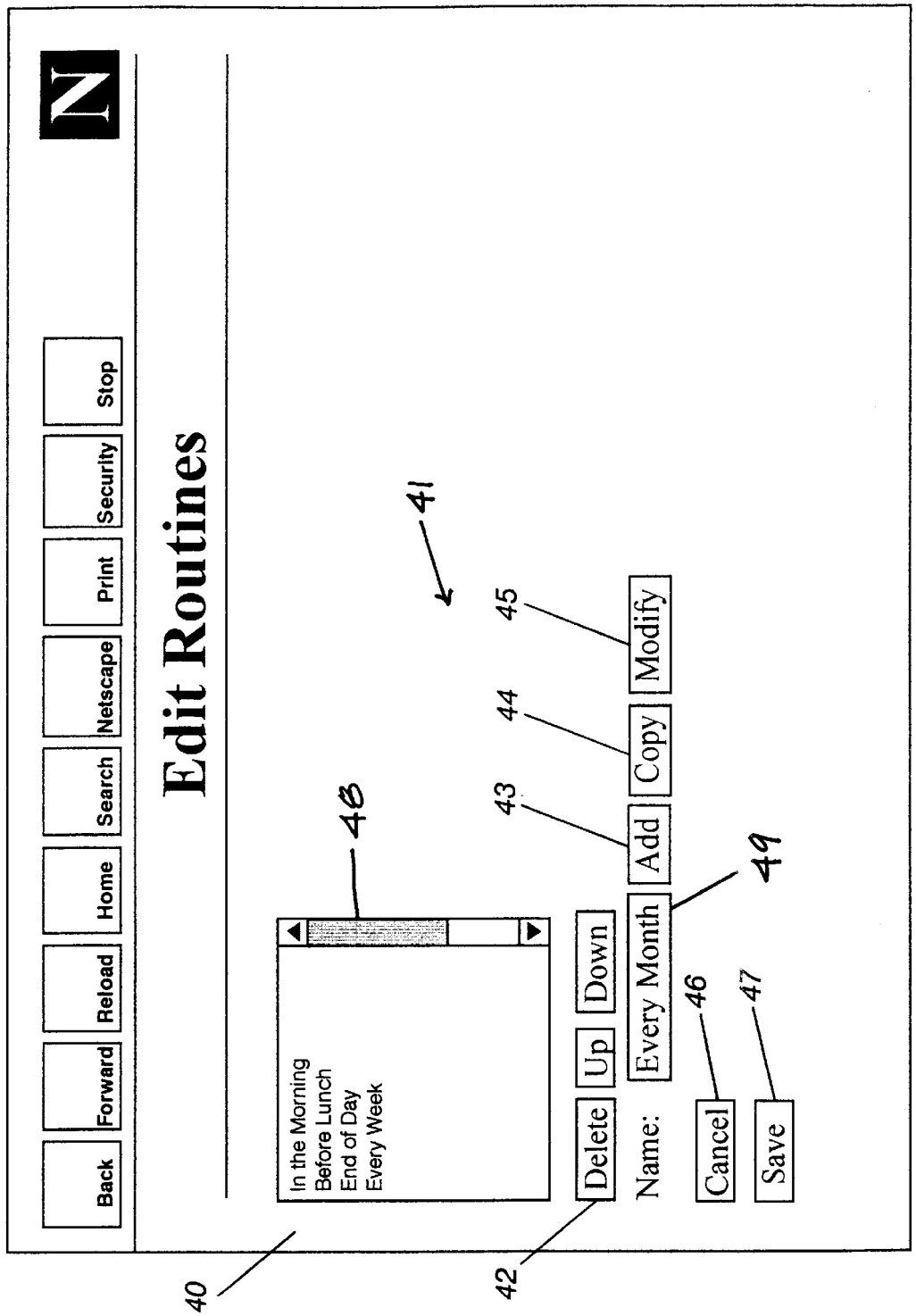

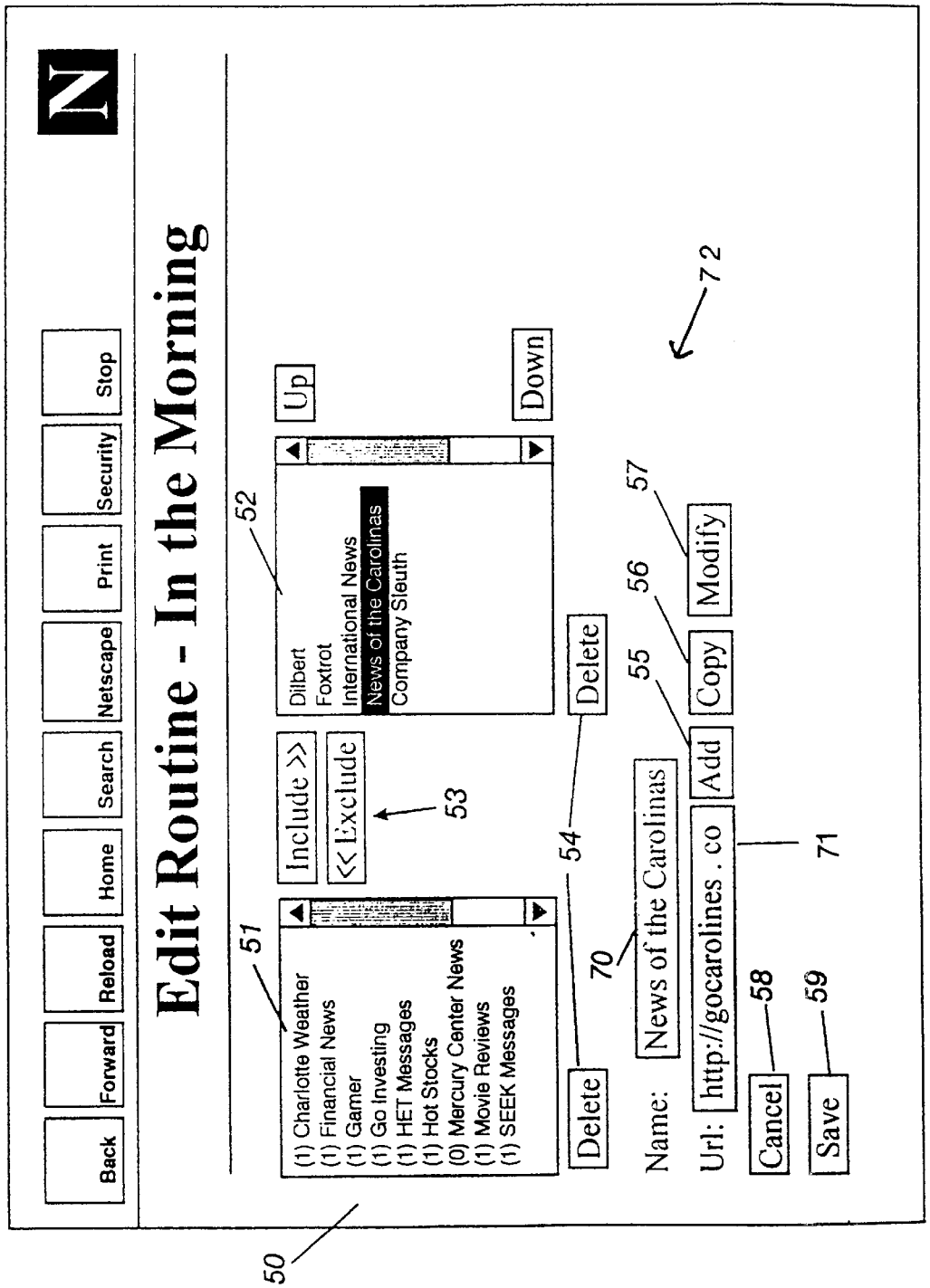

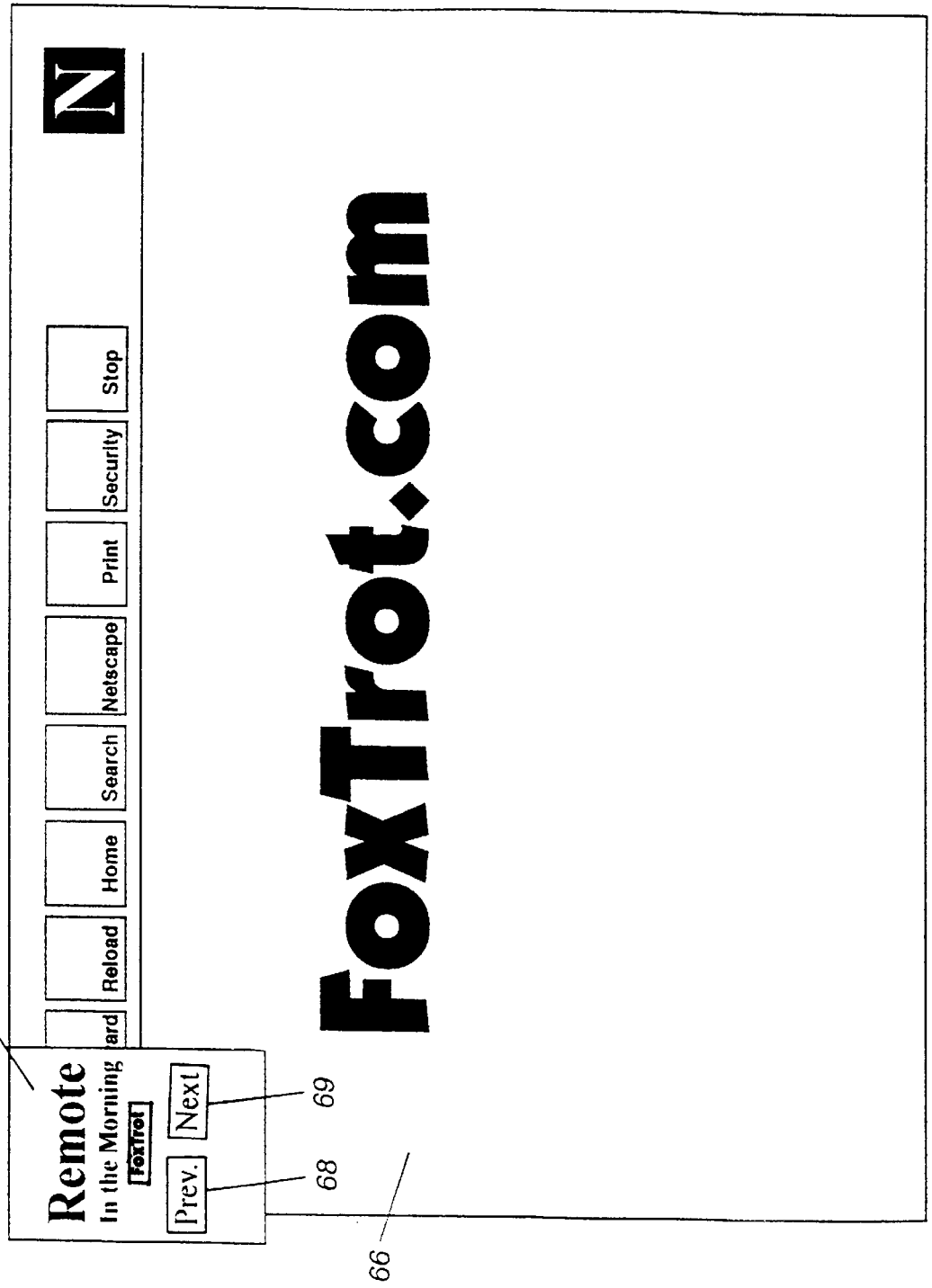

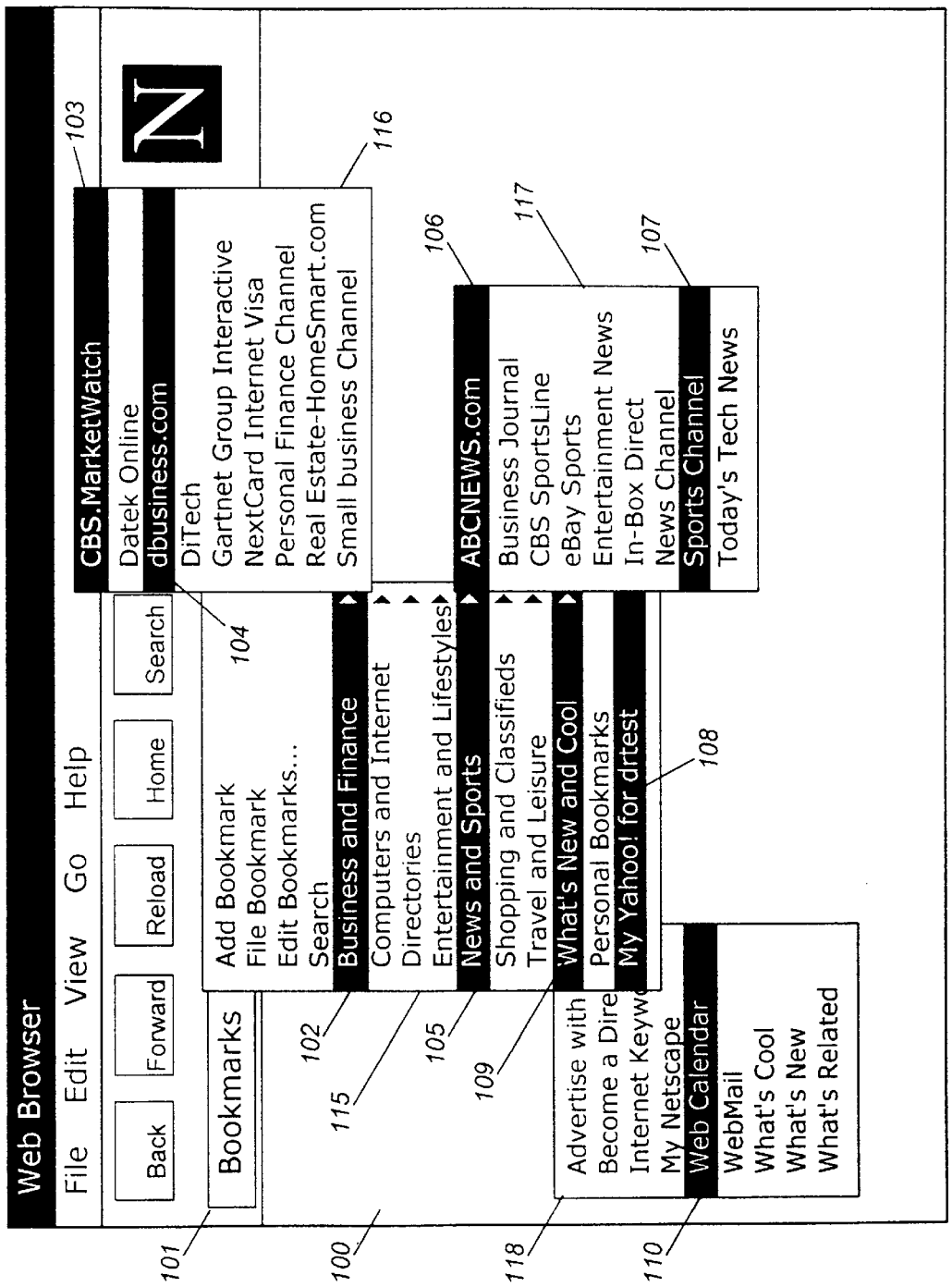

SYSTEM AND METHOD OF ROUTINE NAVIGATION

CROSS REFERENCE TO RELATED APPLICATION

This application claims the benefit of U.S. Provisional Application No. 60/118,562, filed on Feb. 4, 1999.

FIELD OF THE INVENTION

The present invention relates to a system for a user to visit user selected Internet web pages, and more specifically to a system and method for navigating through user selected web pages that the user routinely visits.

BACKGROUND OF THE INVENTION

Originally developed by government and universities, the Internet, a global computer network interconnecting numerous computers, is now used by virtually everyone with access to a computer (especially in North America). The Internet is particularly useful for electronic commerce and information exchange. Providing a foundation for electronic commerce and information exchange, the World Wide Web, or more commonly "the web", is a massive collection of web servers and/or web pages which exist around the world and are interconnected by the Internet.

Each web server has access to the Internet or an intranet (or "private" Internet) and supplies services using web pages. A collection of one or more related web pages are commonly organized by a web site, or "site". A web site can be as simple as a single web page concerning a single topic. Alternatively, a web site may include a myriad of web pages on a wide range of topics. Each web page, or "page", may be thought of as a file found on a computer disk drive or remotely accessible from a web server. A web page is any computer file that conforms to a hypertext mark-up language (HTML) standard file format and presents information understandable to a human.

Within a web page are web links, or "links", that are regions containing a graphical or textual representation and a uniform resource locator (URL) to another page on the web. When a user clicks on or otherwise selects the link, the web browser loads and displays the web page associated with the URL. A URL is essentially a computer address for a web page. URL is the standard for naming specific web pages and includes what protocol to use when retrieving the page, on which specific machine the web page exists and where on that machine's file system the page is stored. To access a web page, the user needs to know the URL of the web page, and each page on the web has its own distinct URL. For example, the URL for CBS News is "http://www.cbsnews.com".

A web browser, or "browser", is a program on a computer which enables the user to examine HTML web pages retrieved by URL over the web. When web browsing, or "browsing", a web browser is used by a computer user to examine information on the World Wide Web. Due to the interconnected nature of web pages, provided by the aforementioned links, web browsing can begin on one page and topic and quickly deviate to other topics as the user's attention is swayed by attractive or interesting web links. Browsing can easily turn into aimless web wandering.

A user commonly connects to the Internet and uses the World Wide Web to find an answer to a specific question, to find entertainment, and to find current news/content. Most web pages are intentionally connected, via links, to other web pages, which are connected to other pages, and those to other pages, and so on. Regardless of the reason a user chooses to begin a web browsing session, the user typically explores at least some of those web links. The user commonly finds pages that the user has never seen before. With the advent of the Internet and the World Wide Web, many thousands of web servers and millions of web pages quickly sprouted. This explosion of web based content also created problems with locating user-desired information and tracking web pages of interest.

There are other ways that a person may find web pages. A user can find the URLs for potentially interesting web pages from movie marquees, television commercials, billboards, magazines/newspapers, and food packages. These web sites very often provide information, solicit consumer feedback, and market products. Well known search engines have also been created to provide web page URLs that are particularly useful when the user knows the topic of the desired pages but doesn't know where to find them.

A seemingly unlimited number of web pages have been developed that are based on an equally unlimited number of diverse topics. Faced with the difficulty of retracing the steps of a browsing session to find previously encountered interesting or relevant pages, several tools have been created to allow a user to keep a reference to the URL of a web page for browsing directly at a later time. To assist users in keeping track of which web pages a user has loaded/visited and which web pages the user might want to return to, the "Go Menu", "History List", "bookmarks", and personal toolbar features have been added by most web browsers.

Go Menu tracks recently loaded URLs in a list format in an order of last in time that is cleared at the end of a web browsing session and is useful for returning to pages that the user visited. History List is a long-term storage version of the Go Menu feature that also includes a list of URLs. However, the History List feature maintains the list across different web browsing sessions until the items on the list expire or the user intentionally empties the list. The History List feature is useful for allowing the user to return to pages that were visited within the last few days. Unfortunately, the ability to organize the Go Menu and History List is out of the user's control. Additionally, Go Menu and History List only provide a temporary list of URLs. If the user desires to keep a URL for a longer term, other methods, which are all based on the bookmark concept, are available.

Most web browsers provide "backward"/"forward" buttons. In a web browsing session, the user typically visits many web sites in any arbitrary order by clicking on the links of the web pages. When the user begins the session, the backward, or "back", button is initially inactive. Once the user chooses a web link and the browser loads the page associated with the link, activation of the back button returns the browser to the page the user was viewing immediately before the link was chosen. The forward button does the opposite of the back button and is inactive until the user activates the back button. After the user activates the back button, the forward button can be used to return the browser to the most recently loaded web page. Unfortunately, conventional backward/forward buttons are subject to the user's real-time selection of web pages and are provided to users merely as an "undo"/"redo" mechanism.

Bookmark, or "Favorites", capture the URL of a single user chosen web page, along with the human readable title for that web page. Keeping a bookmark of a web page allows a user to permanently keep a record of the name and address of a web page for re-visiting in the future. Additionally, "Bookmarks List", or "Favorites list" are provided by most browsers as a permanent storage for one or more user chosen bookmarks and may include a folder metaphor for organizing large numbers of bookmarks by category or theme. Alternatively, bookmarks may be stored on a personalized toolbar provided by some browsers, notably Netscape Navigator which is produced by Netscape.

Internet search sites, or "search sites" or "search engines", and Internet portals, or "portals", find and catalogue as many web pages as possible for users to search. In operation, a user supplies words to search for in web pages, and the search site returns a list of relevant pages. A search site may also provide lists (or menus) of different categories of web page topics which assist in leading the user to web pages of the user's interest.

An Internet portal is a mature web site that provides a wealth of typically unrelated but useful information. The consolidation of information into one web site makes the Internet portal a popular destination. The intent of the portal is to provide enough information so that the user does not need to leave the web site to find other information or entertainment. For example, a small sample of what conventional portals now provide includes: Internet web site searching, breaking news stories, stock quotes, up-to-date sports scores, horoscope information, lottery results and weather forecasts. In order to provide a user with convenient access to user desired web pages, most conventional portals provide a personal link as a substitute for the aforementioned browser based bookmark and a single personal list as a substitute for a browser based bookmarks list. Thus, conventional portals run afoul of the same problems as conventional bookmark concepts.

The bookmarks feature is well suited for web browsing when individual web pages are desired. This process includes deciding which web page to visit, finding the web page in the bookmarks list, and choosing the associated bookmark to load the page. However, if the user has a routine of looking at current web based news/content, and frequents one or more web sites which provide regularly updated information, the process becomes burdensome. In order to visit each of the desired web sites, the user must mentally recall which site is first in the user's routine, find and chose the bookmark, examine the web page (which may take an extended period of time based on whether the user decides to explore web links from that page), decide which of the intended sites in the routine have not yet been visited in this session and repeat this "hunt and click" process with the next site in the routine until all the desired sites have been viewed. This process is time consuming, mentally taxing and subject to mistakes of memory, especially if the user's routine consists of more than three pages. Although, the user can type each of the URLs associated with the web pages into the browser one at a time and forego using bookmarks altogether, this would merely cause more inconvenience, inefficiency and time consumption.

What is therefore needed is a system for navigating through a list of routinely visited web pages with a browser that is convenient and efficient. More particularly, what is needed is a system for navigating through a list of URLs or web pages with a browser that allows a user to specify the list content and list order. Further needed is a system that allows the user to navigate through the list of web pages according to the user specified order using a "Next/Previous" paradigm.

SUMMARY OF THE INVENTION

The present invention is a system for navigating through a list of routinely visited web pages with a browser that is convenient and efficient. More particularly, the present invention provides a system for navigating through a list of URLs or web pages with a browser that allows a user to specify the list content and list order. The present invention provides a system for navigating through the list of web pages that allows the user to navigate through the web pages according to the user specified list order using a "Next/Previous" paradigm.

The invented system comprises a routine list having at least one routine, each routine comprises at least one sequentially ordered user specified web page, means for establishing and specifying a routine from the routine list, and means for sequentially moving from one web page in the specified routine to another web page in the specified routine while browsing. By specifying a routine from the routine list, the user can visit a desired group of web pages in a desired order. The invented system may further comprise a master web page list of user specified web pages for incorporation into each of the routines and means for editing the web page list. The master web page list provides a "pool" of web pages or URLs for the user to include in a particular routine. The means for editing the master web page list allows the user to add or remove desired web pages or URLs for use in any of the routines.

The moving means allows the user to navigate to a next/previous web page in the order of web pages for a particular routine regardless of any intermediate browsing conducted by the user. In a preferred embodiment, the moving means comprises means for advancing from a current web page in the specified routine to a next web page in the specified routine. Optionally, the moving means further comprises means for returning to a previous web page in the specified routine from the current web page in the specified routine. The user is afforded a single button that requires a single click to sequentially move forward through the pages that the user has chosen for a routine. In addition, the user is afforded a single button that requires a single click to sequentially move backward through such pages. When the user specifies and begins a routine, the pages corresponding to the specified routine are served to the web browser one page at a time. The user is allowed to organize and advance through the user-specified pages for a particular routine in a fashion that is comparable to a slide presentation.

Using the means for establishing and specifying a routine, the user can create and label multiple routines depending on the user's own web browsing habits. The means for establishing and specifying a routine from the routine list comprises: means for adding web pages; means for associating web pages to the routines; and means for specifying the order of web pages in the routine. To add web pages or URLs to a routine, associate web pages to a routine, specify the order of web pages in the routine or specify a routine, conventional methods of data entry are used. Examples of such data entry methods include typing a URL into an interface, pointing and clicking, for example with a mouse, on GUI components that correspond to web pages or routines, and dragging and dropping GUI components. The means for specifying further comprises means for editing a routine to allow the user to modify a routine, such as by adding or removing web pages or URLs from the routine.

OBJECTS OF THE INVENTION

The principle object of the present invention is to provide a system and method for navigating through a list of routinely visited web pages.

Another object of the present invention is to provide a system and method for conveniently and efficiently visiting user specified web pages in a user-specified order.

Another, more particular object of the present invention is to provide a system and method for navigating through at least one routine of user specified web pages that provides a simple means for sequentially moving from one web page in the routine to another web page in the routine.

Another object of the present invention is to provide a system and method for navigating through at least one routine of user specified web pages for use with a web browser that may be implemented as a web based application external to the browser, as a core feature of a web browser, or as a browser plug-in module for an existing web browser.

BRIEF DESCRIPTION OF THE DRAWINGS

The foregoing and other objects will become more readily apparent by referring to the following detailed description and the appended drawings in which:

FIG. 4 is a display of an embodiment of an edit routine list screen and means for editing a routine list in accordance with the present invention.

FIG. 5 is a display of an embodiment of an edit routine screen and means for editing a routine in accordance with the present invention.

FIG. 6b is a display of a routine screen showing an advancing means and a returning means in a detached window in accordance with an embodiment of the present invention.

FIG. 7 is a screen display of a known browser feature having a bookmark list that allows a user to return to the desired web pages.

DETAILED DESCRIPTION OF THE INVENTION

The present invention is a system for navigating through a list of routinely visited web pages with a browser that is convenient and efficient. More particularly, the present invention provides a system for navigating through a list of URLs, or web pages, with a browser that allows a user to specify the list content and list order. The present invention provides a system for navigating through the list of web pages that allows the user to navigate through the web pages according to the user specified list order using a "Next/Previous" paradigm.

While the system and method of the present invention are described herein and shown in the figures as an embodiment of a computer system running a Microsoft Windows® operating system and running a Netscape Navigator® Web browser developed by Netscape Corporation of Mountain View, Calif., other conventional computer systems, operating systems networks, and browsers may be used with the present invention as equivalents.

Figure 1:
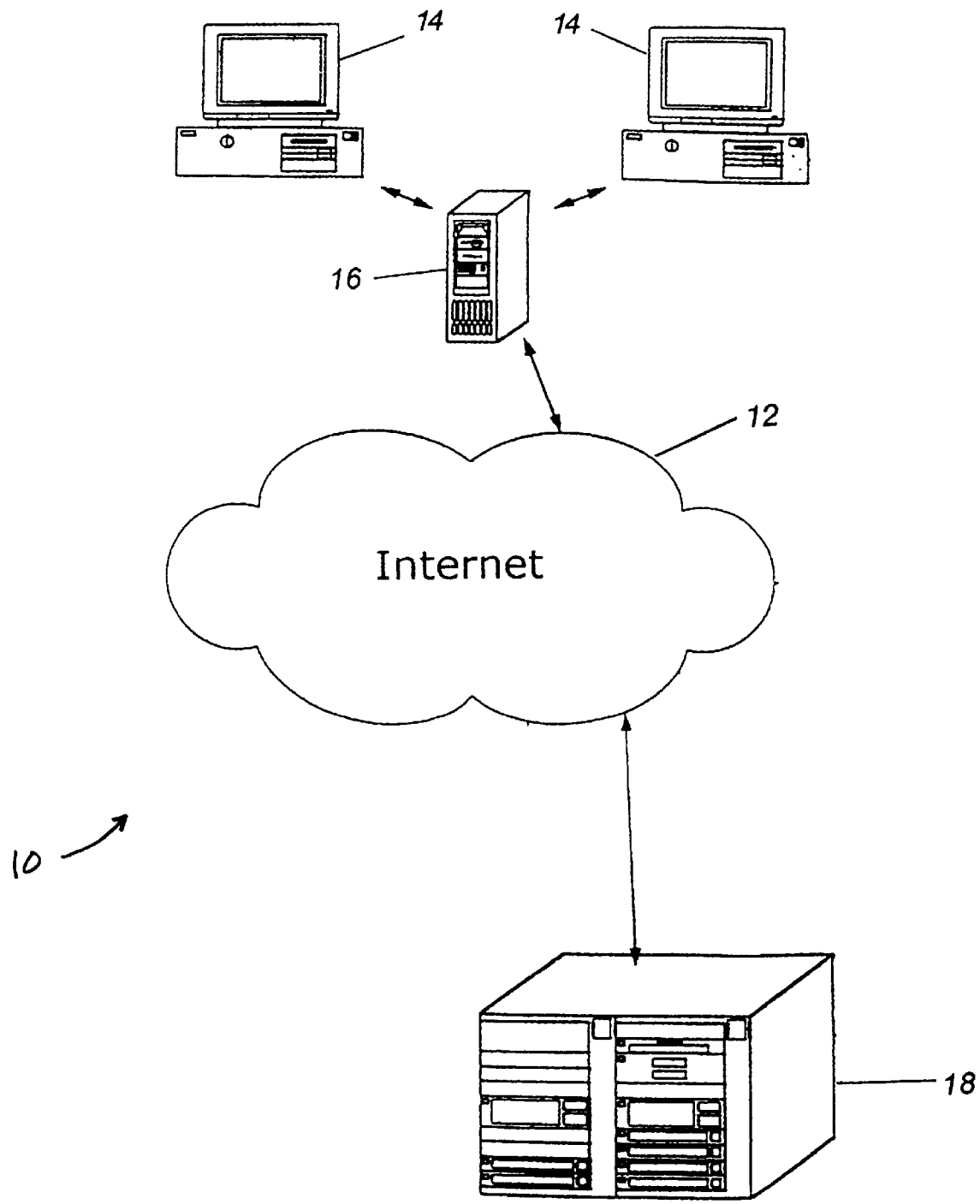
FIG. 1 is a schematic diagram of a network and computer system with which the present invention may be used.

The invented system and method are ideally suitable for use with a conventional web browser. Referring now to the figures, FIG. 1 is schematic diagram of a network, shown generally at 10, and computer system 14 with which the present system and method may be used. The user computer system 14 is coupled to the Internet 12 using a transfer control protocol/internet protocol (TCP/IP) interface. The user connects the computer system 14 to an Internet service provider (ISP) 16 which in turn connects the system 14 to the Internet 12. A web browser on the computer system 14 provides user access to content on the Internet 12 and web sites. The computer system 14 has a monitor, at least one input device, such as a keyboard or mouse, and a connection to the Internet, such as by a modem or local area network. Additionally, the web browser on the computer system 14 may connect to a web server 18 that is connectable to the Internet 12 and that supplies user services through web pages.

In a most basic form, the invented system comprises a routine having a list of user specified web pages for repeated user navigation and viewing with a web page viewer and means for sequentially moving from a first web page to a second web page in the routine. More particularly, the invented system comprises a routine list having at least one routine, each routine comprising at least one sequentially ordered user specified web page, means for controlling a web page viewer for retrieving the user specified web page and displaying the web page, means for establishing and specifying a routine from the routine list, and means for sequentially moving from one web page in the specified routine to another web page in the specified routine while browsing. By specifying a routine from the routine list, the user can visit a desired group of web pages in a desired order. In the following embodiment, the present invention is presented to the user as a web based application that is external to the browser.

The moving means allows the user to navigate to a next/previous web page in the order of web pages for a particular routine regardless of any intermediate browsing conducted by the user. For example, while a web page having a user specified URL in a particular routine is displayed, the user may select one or more links that are found in the current web page. Once the link is selected, the web browser loads and displays the corresponding web page which may have a URL that is different from the user specified URL of the web page in the particular routine. The moving means allows the user to load the next/previous web page in the routine regardless of the web page that is displayed by the web browser and the number of links the user may have selected to arrive at such web page.

In a preferred embodiment, the moving means comprises means for sequentially advancing from a current web page in the specified routine to a next web page in the specified routine. Optionally, the moving means further comprises means for sequentially returning to a previous web page in the specified routine from the current web page in the specified routine. The moving means is coupled to the controlling means.

The user is afforded a single "Next" button that requires a single click to sequentially move forward through the pages that the user has chosen for a routine. In addition, the user is afforded a single "Previous" button that requires a single click to sequentially move backward through such pages. When the user specifies and begins a routine, the pages corresponding to the specified routine are served to the web browser one page at a time under the direction of the controlling means. When the user is finished viewing a web page from the routine, the user may activate these aforementioned "Next" or "Previous" buttons to visit the next web page in sequence or return to a previous web page in sequence. The user is allowed to organize and advance through the user-specified pages for a particular routine in a fashion that is comparable to a slide presentation.

The advancing means and the returning means are preferably clickable graphical user interface (GUI) components, such as icons or buttons, that are located on the periphery of the window displaying the hypertext page, or web page, associated with the current URL. For example, the advancing means is a clickable button icon that is labeled "Next" and the returning means is a clickable button icon that is labeled "Previous". Variations of the labels on the icons are contemplated and include but are not limited to forward/backward directional arrows, Next/Previous, Forward/Back, and plus sign/minus sign. These controls are located around the frame of the window displaying the hypertext page. In an alternative embodiment, the advancing means and the returning means are remotely located with respect to the hypertext page of the currently specified URL. For example, the advancing means is a "Next" button and the returning means is a "Previous" button that are both located in a detached window separated from the window that is displaying the hypertext page. This embodiment is particularly well suited for downloaded web pages which may escape the frame of the window displaying the hypertext page, and remove or obscure the Next/Previous buttons.

Using the invented system, the user can create and label multiple routines depending on the user's own web browsing habits. For example, the user may create the following multiple routines to view on different periodic bases: a theater performance information web site and movie review web site for visiting once a month; a television schedule web site, a 5-day local weather forecast, and an investment tips web site for visiting each week; a web based comic strip, an international news web site and a local news web site for visiting in the morning of each day; and, a stock quotes web page and several interactive message board web sites for visiting every few hours throughout the work day.

The means for establishing and specifying a routine from the routine list comprises: means for adding web pages; means for associating web pages to the routines; and means for specifying the order of web pages in the routine. To add web pages to a routine, associate web pages to a routine, specify the order of web pages in the routine or specify a routine, conventional methods of data entry are used. Examples of such data entry methods include typing a URL into an interface, pointing and clicking, for example with a mouse, on GUI components that correspond to URLs or routines, and dragging and dropping GUI components. The means for specifying further comprises means for editing a routine to allow the user to modify a routine, such as by adding or removing web pages from the routine. Once the user specifies which web pages or URLs are to be visited in a particular routine, the particular routine is ready for use at any frequency the user desires.

The invented system may further comprise a master web page list of user specified web pages for incorporation into each of the routines and means for editing the master web page list. The master web page list provides a "pool" of web pages or URLs for the user to include in a particular routine. The means for editing the master web page list allows the user to add or remove desired web pages for use in any of the routines.

The invented system and method may reside external to the web browser as a web based application, or internal to the web browser as a native application. If the invented system and method reside internal to the web browser, the invented system and method may be incorporated as part of a new software, new upgrade versions of existing software or as a standard add-on module to existing software. Additionally, the invented system and method collects information, such as desired URLs for a particular routine, from the user, then controls the web browser through all of the user selected web pages found in the routines with a substantially simple interface. The Previous and Next navigation controls are available to the user at all times once the routine is initiated. The invented system and method allow the user to create/customize the routines as well to specify/modify/reorder web pages within such routines.

Figure 2:
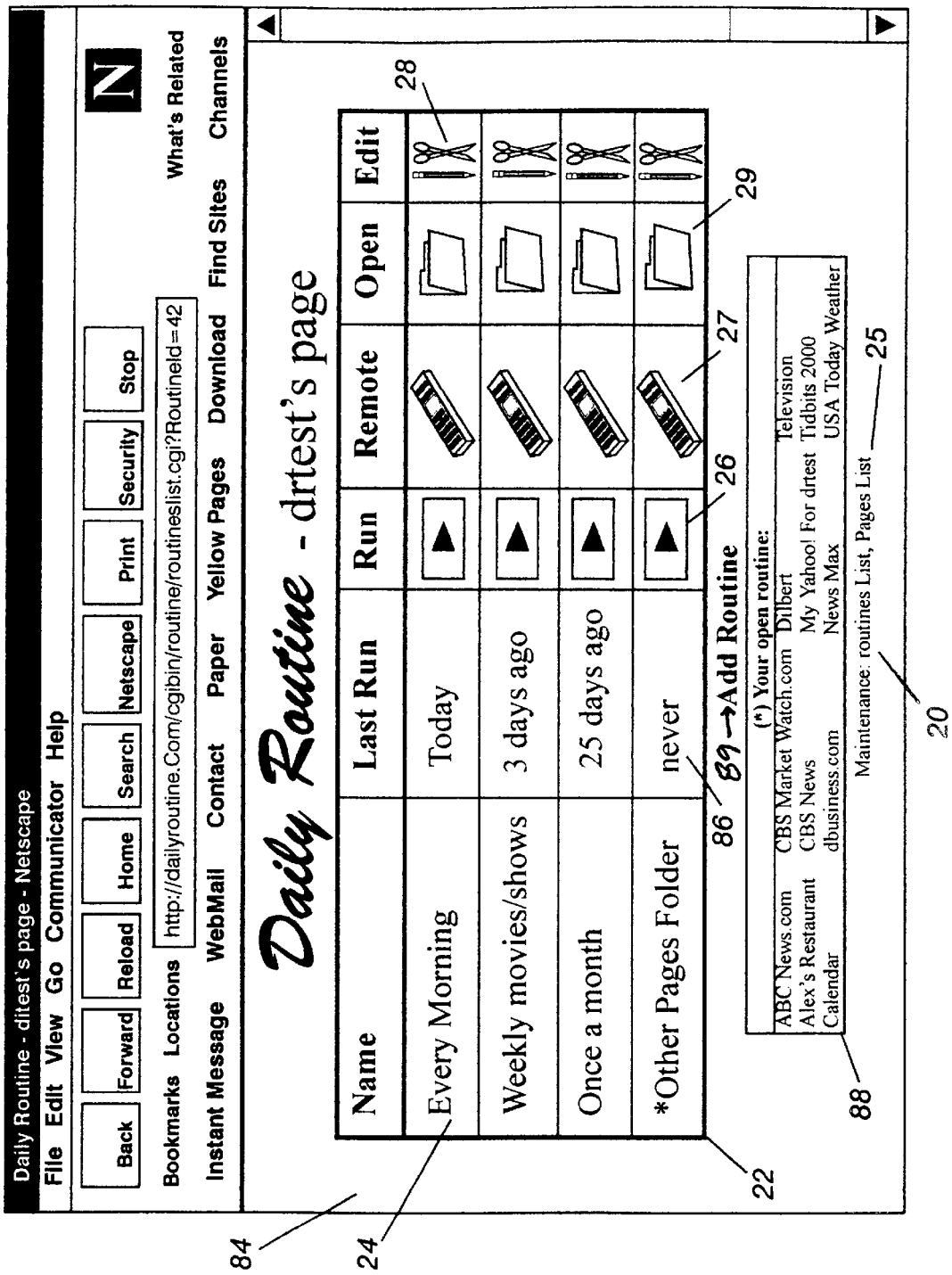
FIG. 2 is a display of an embodiment of a routine list screen in accordance with the present invention.

FIG. 2 is a screen display of an embodiment of a routine list screen 84 in accordance with the present invention. The routine list 22 is displayed on the routine list screen 84 along with identifiers 24, or names, for each routine that is entered by the user. Information regarding the most recent activation of a particular routine is displayed next to each associated routine, shown at 86. Buttons or icons are also displayed with each routine that allow a user to start (START) 26, or run, a particular routine, remote operate (REMOTE) 27 a particular routine, open (OPEN) 29, or view, a particular routine to view user selected web pages associated with the routine, and edit (EDIT) 28 a selected routine. When the open 29 icon or button is activated, the web pages associated with the opened routine are preferably listed.

Additionally, a means for adding a routine, shown generally at 89, may be provided in order to allow a user to link to the mechanisms at a edit routine list screen 40 (FIG. 4) and a edit routine screen 50 (FIG. 5), described in further detail hereinbelow. When a particular routine is opened, the routine list screen 84 provides a list of the web sites 88 associated with the opened routine. The routine list screen 84 additionally provides a means for linking to the edit routine list screen 40, shown at 20, and means for linking to the edit web page screen 30, shown at 25. The means for linking 20 to the edit routine screen and the means for linking 25 to the edit web page screen may be provided as buttons or icons that link to other locations in the present invention.

Figure 3:
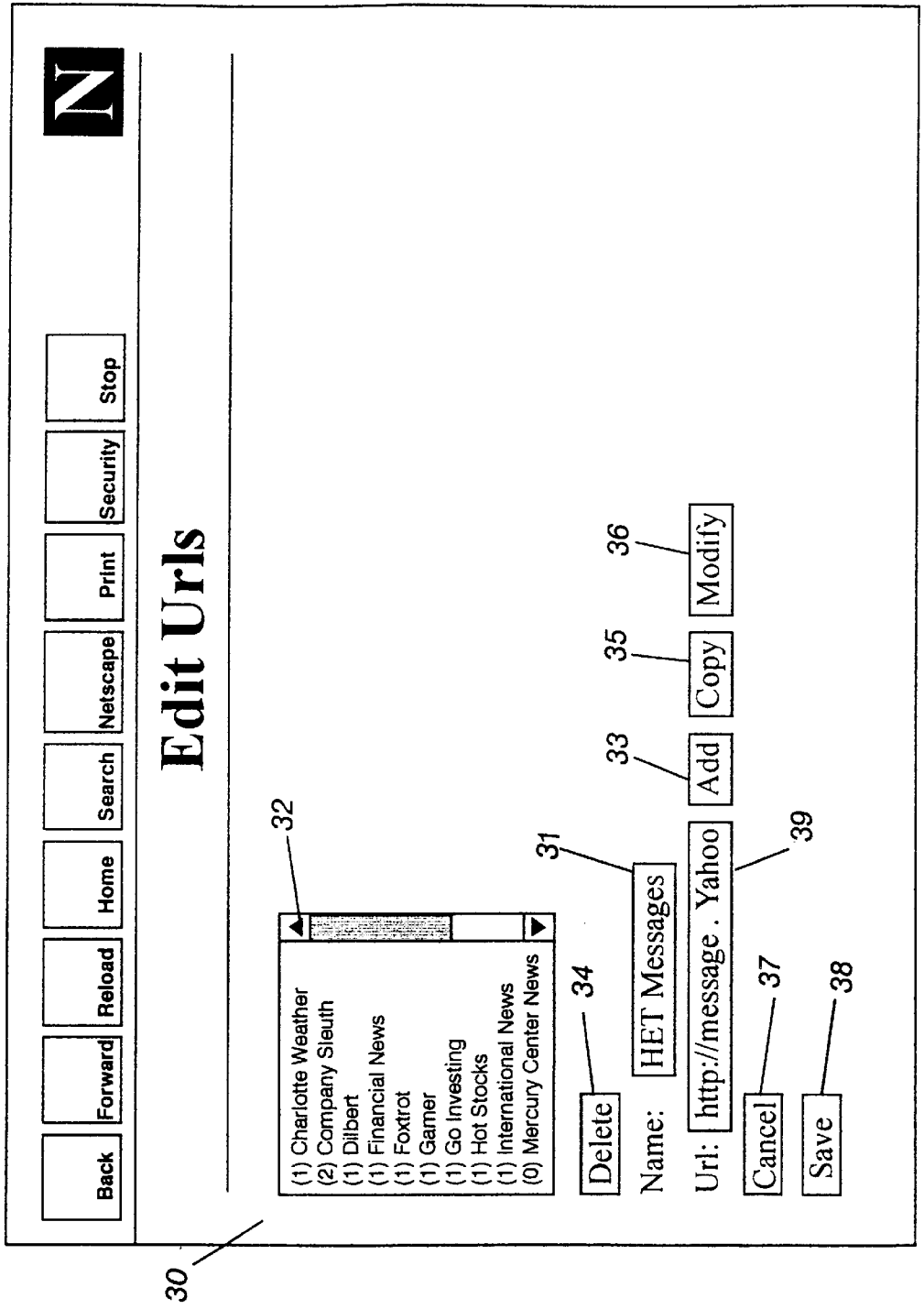
FIG. 3 is a display of an embodiment of a web page list screen in accordance with the present invention.

FIG. 3 is a display of an embodiment of a web page list screen 30 in accordance with the present invention. When PAGES LIST 25 (FIG. 2) is activated on the routine list screen 84, for example by clicking on the text, the web page list screen 30 is displayed and the current master web page list 32 is presented to the user along with a name field 31 and an address, or URL, field 39. The user may identify a desired web site using a user chosen name and entering the corresponding URL for such site. Additionally, the user may add (ADD) 33 a new page with a user entered name and associated URL, delete (DELETE) 34 a selected page from the web page list 32, copy (COPY) 35 the name of a selected page to the name field 31 and address field 39, or modify (MODIFY) 36 a selected page by clicking on the appropriate text or icon. The user may also save (SAVE) 38 changes to the web page list 32 or cancel (CANCEL) 37 changes to the web page list 32 by clicking a button or icon that is associated with the same. The web page list screen 30 provides a user selected collection of web pages or URLS that may be assigned to a particular routine.

FIG. 4 is a display of an embodiment of an edit routine list screen 40 and means for editing a routine list, shown generally at 41, in accordance with the present invention. When ROUTINES LIST 20 (FIG. 2) is activated on the routine list screen 84, the edit routine list screen 40 is displayed along with the routine list 48 and a name field 49. The user selects a routine for editing by highlighting the appropriate routine name in the routine list 48. Additionally, the user may ADD 43 a new routine to the routine list 48, COPY 44 a selected routine name to the name field, or MODIFY 45 the name of a selected routine, and may CANCEL 46 or SAVE 47 changes to the routine list by clicking onto an appropriate button or icon.

For example, when the user desires to change the name of a particular routine, the user highlights the particular routine in the routine list 48, types a new name in the name field 49, and clicks on to the MODIFY icon 45. In another example, if the user desires to delete a particular routine, the user simply highlights the routine in the routine list 48 and clicks on the DELETE icon 42 to remove the routine from the routine list 48.

FIG. 5 is a display of an embodiment of an edit routine screen 50 and means for editing a routine, shown generally at 72, in accordance with the present invention. When the EDIT icon 28 (FIG. 2) is activated on the routine list screen 84, the edit routine screen 50 is displayed along with the unused portion of the master web page list 51, a web page list 52 for the selected routine, a name field 70 and a URL field 71. The user may ADD 55 a page with a user entered name and associated URL, COPY 56 the name of a selected page to the name field 70 and address field 71, or MODIFY 57 the selected URL, or page, in the master web page list 51 or in the web page list 52 for the selected routine to the entered name field 70 and address field 71. Additionally, the user may CANCEL 58 or SAVE 59 changes made to the edit routine screen 50 by clicking onto an appropriate button or icon. The means for editing a routine 72 displays the available web sites or pages that a user may incorporate into a particular routine from the master web page list 51. The edit routine screen 50 allows a user to identify which web sites are associated with a particular routine.

A page that is selected from the master web page list 51 may be moved into and out of a selected routine by simply highlighting the desired page in the master web page list 51 or the web page list 52 for the selected routine and clicking an INCLUDE or EXCLUDE icon, shown generally at 53. Each routine is order specific, and the user may reorder the selected pages within a particular routine using conventional methods of data entry. The user may also DELETE 54 selected pages from the master web page list 51 or selected pages from the web page list 52 that are associated with a particular routine.

Figure 6A:
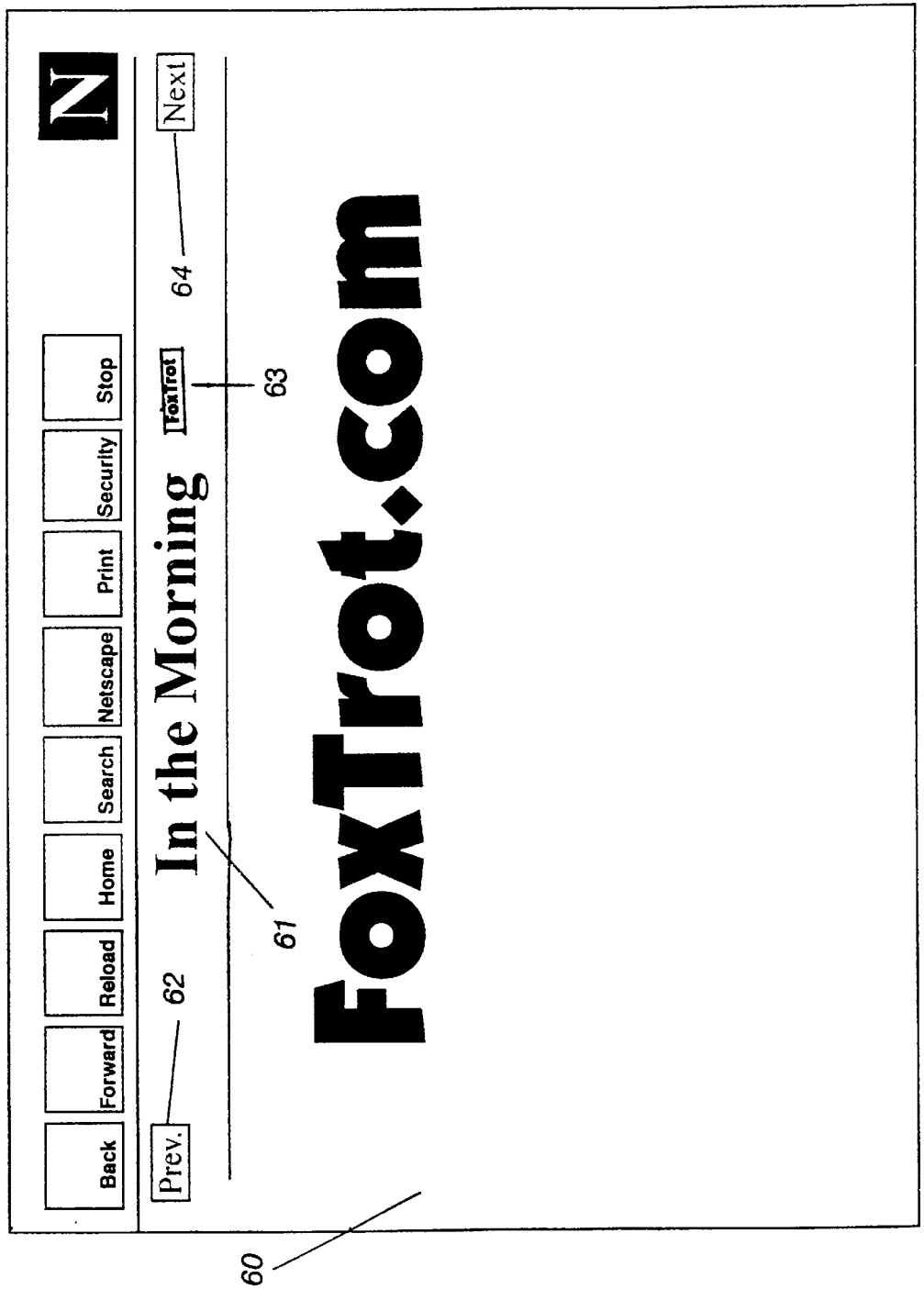
FIG. 6a is a display of a routine screen showing an advancing means and a returning means in accordance with an embodiment of the present invention.

FIG. 6a is a display of a routine screen 60 showing an advancing means 64 and a returning means 62 in accordance with an embodiment of the present invention. When a START icon 26 is clicked on the routine list screen 84, the routine associated with the selected START icon 26 is activated. A routine screen 60 is presented, and the advancing means 64 and returning means 62 are positioned on the periphery of the routine screen 60 so as to always be available and not interfere with the display of the current web page. In a preferred embodiment of the present invention, a banner 61 is displayed across the top of the displayed web page 60 that identifies the selected routine and optionally contains advertising. Alternatively, the banner may be displayed at various locations on the screen display.

The routine screen 60 may additionally display an indicator 63 of the currently viewed web page. For example, the indicator 63 may be a list box that displays the name or address of a web page in a routine that is visited by the user. Even if the user links to other sites after arriving at the web page in the routine, and such sites are displayed in the routine screen 60, the list box displays the currently visited web page in the routine. The indicator positioned in the banner 61, or remote 67, described further hereinbelow, does not change until one of the associated controls, such as Next/Previous 64, 62 or 69, 68, is used.

FIG. 6b is a display of a routine screen 66 showing an advancing means 69 and a returning means 68 with a remote paradigm 67 in accordance with an embodiment of the present invention. In this embodiment, the advancing means 69 and the returning means 68 are both positioned within the remote paradigm 67 and located on the periphery of the routine screem 66. This embodiment of the present invention is particularly suited for web sites that do not allow a border or banner, as shown in FIG. 6a, to be framed around the web page. The remote paradigm 67 provides the user with the ability to view the next web site in the routine or view the previous web site in the routine regardless of potential web site interference, which may intentionally or unintentionally remove the banner 61 (FIG. 6a).

In this embodiment, the aforementioned indicator 63 is positioned in the remote 67. The indicator 63 may additionally display all of the web pages that are associated with the routine being operated by the user and provide a clickable button for each web page. The list box also allows the user to jump out of the web page sequence and view any of the web pages associated with the routine by simply clicking on an associated page or name in the list box. The advancing means 64, 69 and the returning means 62, 68 are preferably presented to the user as clickable buttons or icons.

The present invention may optionally include a "quick-add" means for adding web sites to the master web page list 32, or directly to the web page list 52 for a routine. When a routine is selected, and the user has located a desirable web page, the quick-add feature allows the user to easily add the page to the routine without having to manually type the information into a text field. Another embodiment of the quick add feature is to provide icons, buttons, and links on various associated and non-associated web pages found across the Internet which, when activated, conveniently add specific web pages to the master web page list 32, and if requested, make the association to the web page list 52 for specific routines. For example, the quick-add means may be a link on the CBSNews web page that allows a user to quickly add the page to the routine with a single action.

EXAMPLE 1

FIG. 7 is a screen display of a known web browser having a bookmark feature that allows a user to retrieve desired web pages. The known web browser page 100 includes a bookmark feature 101 for a user to keep a record of favored web sites or web pages for future recall. When the user desires to sequentially view cbs.marketwatch, dbusiness.com, abcnews.com, sportschannel, myyahoo!, and webcalender using the known web browser bookmark feature, the user must make numerous physical and mental steps. For example, the user must initially click onto the bookmark feature 101. By clicking on the bookmark feature 101, a menu 115 is displayed and the user must click onto a business and finance folder 102. By clicking on the business and finance folder 102, a menu 116 associated with the business and finance folder is displayed along with the web sites. The user must click on a cbs.marketwatch bookmark 103 to display the cbs.marketwatch web site.

After the user has viewed the cbs.marketwatch web site, the user must again click on the bookmarks feature 101 to open the bookmark menu 115. The user must then re-access the business and finance folder 102 to display the associated business and finance menu 116. The user must then click on a dbusiness.com 104 bookmark in order to display the dbusiness.com web site. After the user has viewed the dbusiness.com web site, the user must then click on the bookmark feature 101 to again display the bookmark menu 115. The user must then click on a news and sports folder 105 to gain access to an associated news and sports menu 117 of web sites. The user must then click on an abcnews-.com bookmark 106 to display the abcnews.com web site.

After the user has finished viewing the abcnews.com web site, the user must then click on the bookmark feature 101 to reopen the bookmark menu 115. The user must then click on the news and sports folder 105 in order to display the associated news and sports menu 117 of web sites. The user must then click on a sports channel bookmark 107 in order to display the sports channel web site. After the user has finished viewing the sports channel web site, the user must then click on the bookmark feature 101 to access the bookmark menu 115 and locate and click on a myyahoo! icon 108. After the user has finished viewing the myyahoo! web site, the user must then click on the bookmark feature 101 in order to view the bookmark menu 115. The user must then click on a what's new and cool folder 109 in order to view an associated what's new and cool menu 118 of web sites. The user must then click on a web calendar 110 bookmark in order to display the web calendar web site. The known process of retrieving web sites using a bookmark feature is clearly an over-complicated task, involving multiple steps and multiple memory recalls of web site-folder organization, when the user desires to view a list of routinely visited web sites.

EXAMPLE 2

Figure 8:
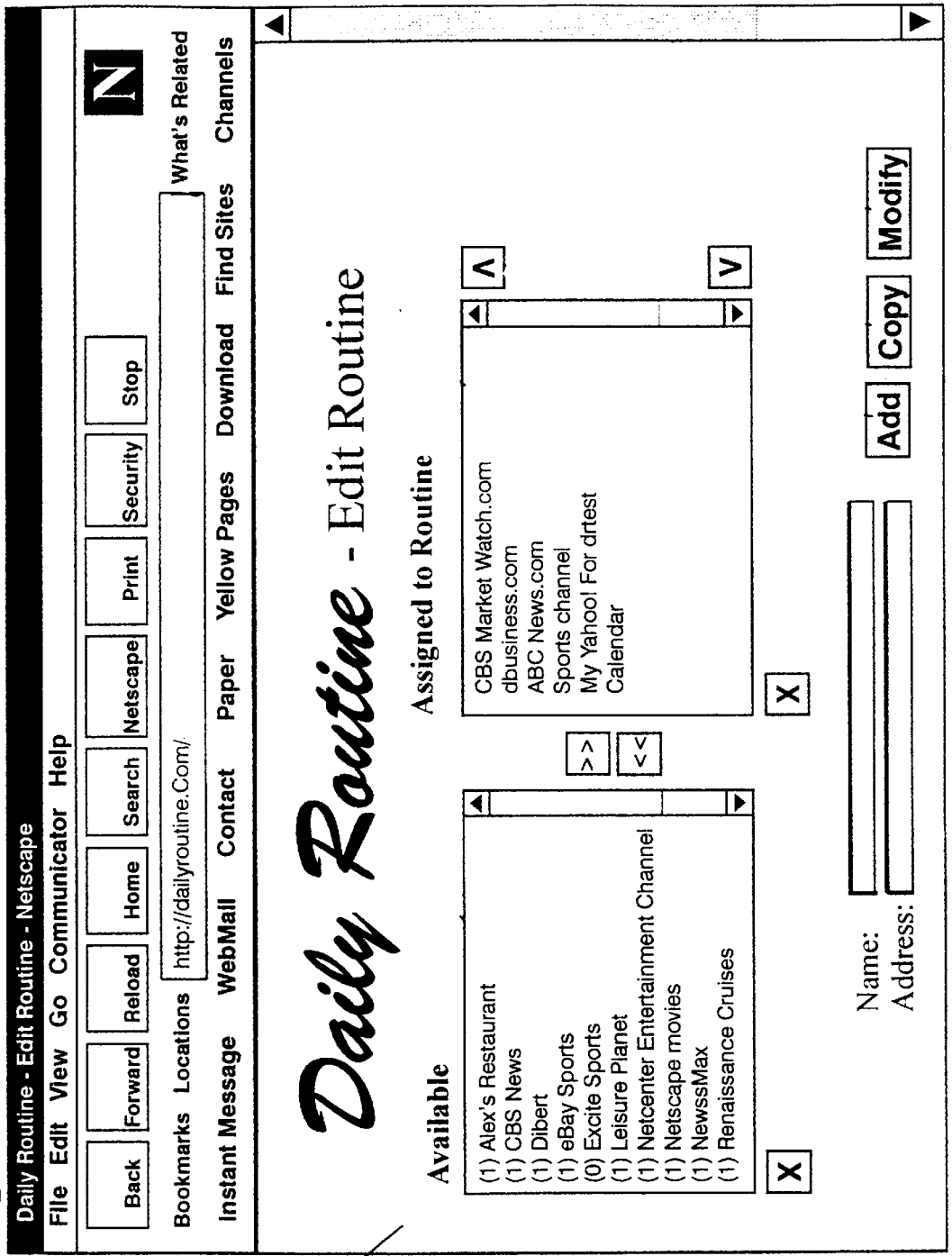
FIG. 8 is a display of an embodiment of an edit routine screen and a means for editing a routine list in accordance with the present invention.

FIG. 8 is a display of an embodiment of an edit routine screen 90 and a means for editing a routine in accordance with the present invention. The edit routine screen 90 shows the content of this example's routine as a different embodiment of the edit routine screen 50 (FIG. 5). The edit routine screen 90 may also include a library (not shown) of predetermined websites, URLs, or web pages for conveniently adding to the master web page list 32 or directly to the web page list 52 (FIG. 5) for a selected routine.

Figure 9:
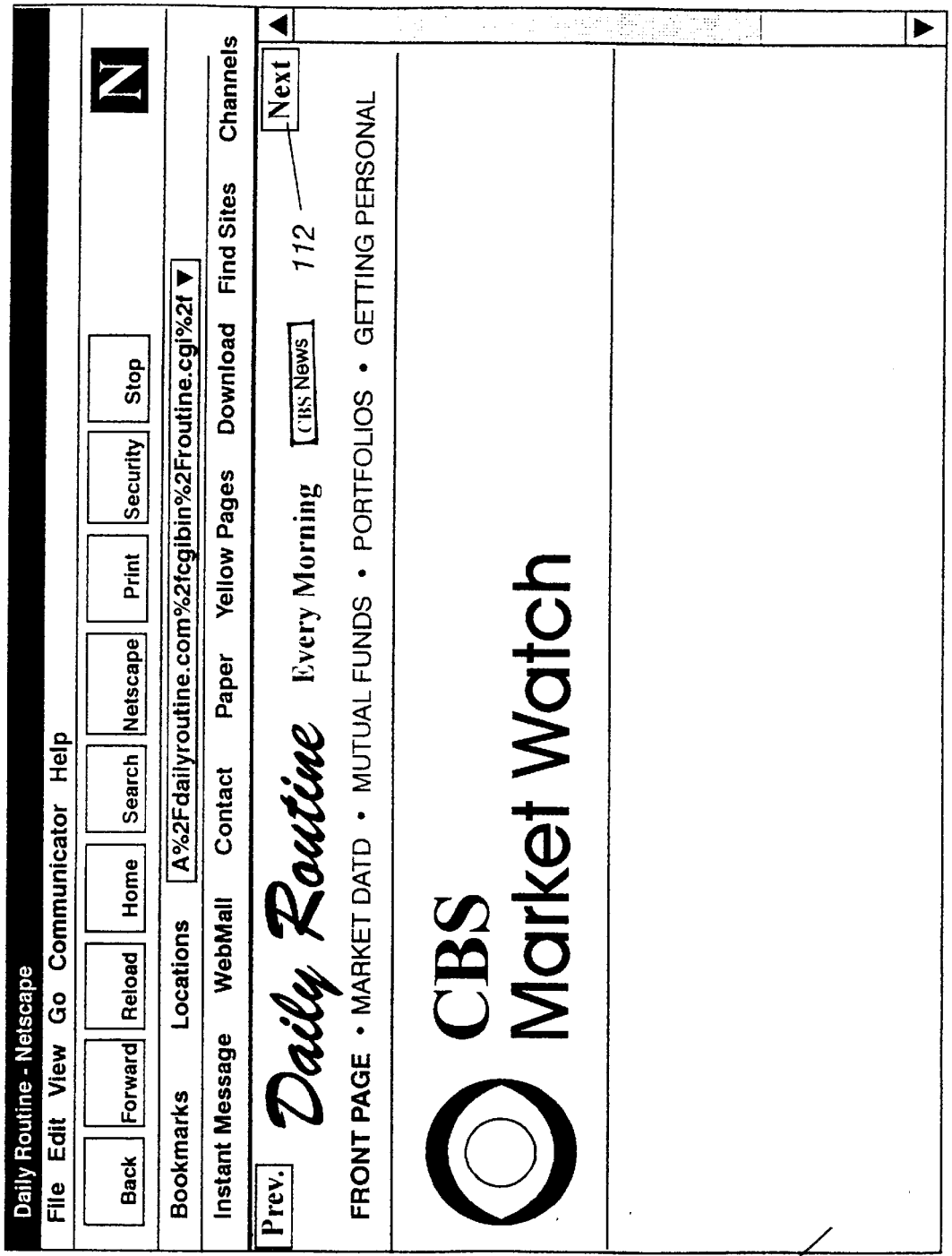
FIG. 9 is a display of an embodiment of a routine screen in accordance with the present invention.

FIG. 9 is a screen display of an embodiment of a routine page 111 in accordance with the present invention. When the run icon 26 is activated on the routine list screen 84 (FIG. 2), the first web site associated with the selected routine is presented to the user. In comparison with the previous example where the user desires to sequentially view cbs.marketwatch, dbusiness.com, abcnews.com, sportschannel, myyahoo!, and webcalender, the invented system and method allows the user to view the same web sites by simply clicking on the advancing means or NEXT 112 button or icon. For example, the cbs.marketwatch web site is initially displayed to the user. To view the next web site for the routine, or dbusiness.com, the user clicks on the NEXT 112 button or icon and the abcnews.com web site is displayed to the user. After the user has finished viewing the abcnews.com web site, the user clicks on the NEXT 112 button or icon and the sportschannel web site is displayed to the user. After the user has finished viewing the sportschannel web site, the user clicks on the NEXT 112 button or icon and the myyahoo! web site is displayed to the user. After the user has finished viewing the myyahoo! web site, the user clicks on the NEXT 112 button or icon and the webcalender web site is linked and displayed to the user.

In contrast with conventional web site retrieval, the present invention eliminates the memory recall and the multiple precise action burdens that are required for viewing routinely visited web sites with the features provided in existing web browsers.

SUMMARY OF THE ACHIEVEMENTS OF THE OBJECTS OF THE INVENTION

The present invention provides a system and method for navigating through a list of routinely visited web pages. The present invention provides a system and method for conveniently and efficiently visiting user specified web pages in a user-specified order. The present invention provides a system and method for navigating through at least one routine of user specified web pages that provides a simple means for sequentially moving from one web page in the routine to another web page in the routine. The present invention provides a system and method for navigating through at least one routine of user specified web pages for use with a web browser that may be implemented as a web based application external to the browser, as a core feature of a web browser, or as a browser plug-in module for an existing web browser.

It is to be understood that the foregoing description and specific embodiments are merely illustrative of the best mode of the invention and the principles thereof, and that various modifications and additions may be made to the apparatus by those skilled in the art, without departing from the spirit and scope of the invention, which is therefore understood to be limited only by the scope of the appended claims.

What is claimed is:

1. A system for navigating through a plurality of user specified web pages, said system comprising:
    a routine having a list of user specified web pages for repeated user navigation and viewing with a web page viewer;
    means for sequentially moving from a first web page in said routine to a second web page in said routine;
    wherein said moving means comprises:
    means for advancing from said first page in said routine to said second page in said routine;
    means for returning to said first page in said routine from said second page in said routine; and
    further comprising a banner positioned on the periphery of a viewed page, wherein said advancing means and said returning means are positioned on said banner.

2. A system for navigating through a plurality of user specified web pages, said system comprising:
    a routine having a list of user specified web pages for repeated user navigation and viewing with a web page viewer;
    means for sequentially moving from a first web page in said routine to a second web page in said routine;
    wherein said moving means comprises:
    means for advancing from said first page in said routine to said second page in said routine;
    means for returning to said first page in said routine from said second page in said routine; and further comprising a remote positioned on a viewed page, wherein said advancing means and said returning means are positioned on said remote.

3. A system according to claim 1 further comprising quick-add means positioned on said banner for adding a web page to said page list with a single user action and associating said web page with said routine.

4. A system for navigating through a routine having user specified web pages in a user specified order, said system coupled to a web page viewer, said system comprising:

a routine list, said routine list comprising at least one routine, each of said at least one routine comprising at least one sequentially ordered user specified web page;

means for controlling the web page viewer for displaying said at least one user specified web page;

means for editing said routine list;

means for establishing and specifying a routine from said routine list;

means for sequentially moving from a current page in the specified routine to a next/previous page in the specified routine, said moving means coupled to said controlling means;

wherein said moving means comprises:

means for advancing from said current page in the specified routine to said next page in the specified routine;

means for returning to said previous page in the specified routine from said current page in the specified routine; and further comprising a banner positioned on the periphery of the displayed page, wherein said advancing means and said returning means are positioned on said banner.

5. A system for navigating through a routine having user specified web pages in a user specified order, said system coupled to a web page viewer, said system comprising:

a routine list, said routine list comprising at least one routine, each of said at least one routine comprising at least one sequentially ordered user specified web page;

means for controlling the web page viewer for displaying said at least one user specified web page;

means for editing said routine list;

means for establishing and specifying a routine from said routine list;

means for sequentially moving from a current page in the specified routine to a next/previous page in the specified routine, said moving means coupled to said controlling means;

wherein said moving means comprises:

means for advancing from said current page in the specified routine to said next page in the specified routine;

means for returning to said previous page in the specified routine from said current page in the specified routine; and further comprising a remote, wherein said advancing means and said returning means are positioned on said remote.

* * * * *